(12) United States Patent
Tsuria

(10) Patent No.: US 7,802,100 B2
(45) Date of Patent: *Sep. 21, 2010

(54) WATERMARK SYSTEM

(75) Inventor: Yossef Tsuria, Jerusalem (IL)

(73) Assignee: NDS Limited, Middlesex (GB)

( * ) Notice: Subject to any disclaimer, the term of this patent is extended or adjusted under 35 U.S.C. 154(b) by 843 days.

This patent is subject to a terminal disclaimer.

(21) Appl. No.: 11/595,157

(22) Filed: Nov. 10, 2006

(65) Prior Publication Data

US 2007/0061585 A1  Mar. 15, 2007

Related U.S. Application Data

(63) Continuation of application No. 11/053,407, filed on Feb. 8, 2005, now Pat. No. 7,200,751, which is a continuation of application No. 09/544,704, filed on Apr. 7, 2000, now Pat. No. 7,007,165.

(30) Foreign Application Priority Data

May 2, 1999 (IL) ...................................... 129725

(51) Int. Cl.
  *H04L 9/00* (2006.01)
  *G06K 9/36* (2006.01)
  *G06K 9/00* (2006.01)
  *H04K 1/00* (2006.01)
  *G09C 5/00* (2006.01)
  *H04N 7/167* (2006.01)

(52) U.S. Cl. ........................ 713/176; 382/232; 382/100; 380/269; 380/54; 380/201; 380/203; 380/217

(58) Field of Classification Search .................. 713/176; 382/232, 100; 380/269, 54, 201, 203, 217
See application file for complete search history.

(56) References Cited

U.S. PATENT DOCUMENTS

| 5,606,609 A | 2/1997 | Houser et al. |
| 5,607,188 A | 3/1997 | Bahns et al. |
| 5,613,214 A | 3/1997 | Kamachi et al. |
| 5,636,292 A | 6/1997 | Rhoads |

(Continued)

FOREIGN PATENT DOCUMENTS

EP    0 600 646    6/1994

(Continued)

OTHER PUBLICATIONS

Digimarc Corporation, *Digimarc Watermarking Guide*, 1997, USA, pp. 1-18.

(Continued)

*Primary Examiner*—Kaveh Abrishamkar
(74) *Attorney, Agent, or Firm*—Ladas and Parry LLP

(57) ABSTRACT

A method for examining an electronic representation of an item for a watermark, the method including examining at least a first electronic representation of an item for a watermark in accordance with a first watermark definition, receiving a signal indicating that a second watermark definition is to be used for examining electronic representations, and examining at least a second electronic representation of an item for a watermark in accordance with the second watermark definition.

Related apparatus and methods are also provided.

16 Claims, 5 Drawing Sheets

U.S. PATENT DOCUMENTS

| | | | |
|---|---|---|---|
| 5,659,726 A | 8/1997 | Sandford, II et al. | |
| 5,664,018 A | 9/1997 | Leighton | |
| 5,680,458 A | 10/1997 | Spelman et al. | |
| 5,687,236 A | 11/1997 | Moskowitz et al. | |
| 5,933,798 A | 8/1999 | Linnartz | |
| 6,229,924 B1 | 5/2001 | Rhoads et al. | |
| 6,272,634 B1 | 8/2001 | Tewfik et al. | |
| 6,314,518 B1 * | 11/2001 | Linnartz | 713/176 |
| 6,332,194 B1 * | 12/2001 | Bloom et al. | 713/176 |
| 6,374,036 B1 | 4/2002 | Ryan et al. | |
| 6,442,285 B2 | 8/2002 | Rhoads et al. | |
| 6,493,457 B1 | 12/2002 | Quackenbush et al. | |
| 6,591,365 B1 | 7/2003 | Cookson | |

FOREIGN PATENT DOCUMENTS

| | | |
|---|---|---|
| EP | 0 651 554 | 5/1995 |
| EP | 0 903 943 | 3/1999 |
| WO | 96/41468 | 12/1996 |
| WO | 97/13248 | 4/1997 |
| WO | 97/22206 | 6/1997 |
| WO | 97/26732 | 7/1997 |
| WO | 97/26733 | 7/1997 |
| WO | 97/34391 | 9/1997 |
| WO | 98/02864 | 1/1998 |
| WO | 98/03014 | 1/1998 |
| WO | 99/18723 | 4/1999 |

OTHER PUBLICATIONS

Macrovision Corporation and Digimarc Corporation, *Project DigiLock—The Digital Content Protection Solution for Copy Control and Play Control and Play-C,* Fall 1997, pp. 1-24, USA.

* cited by examiner

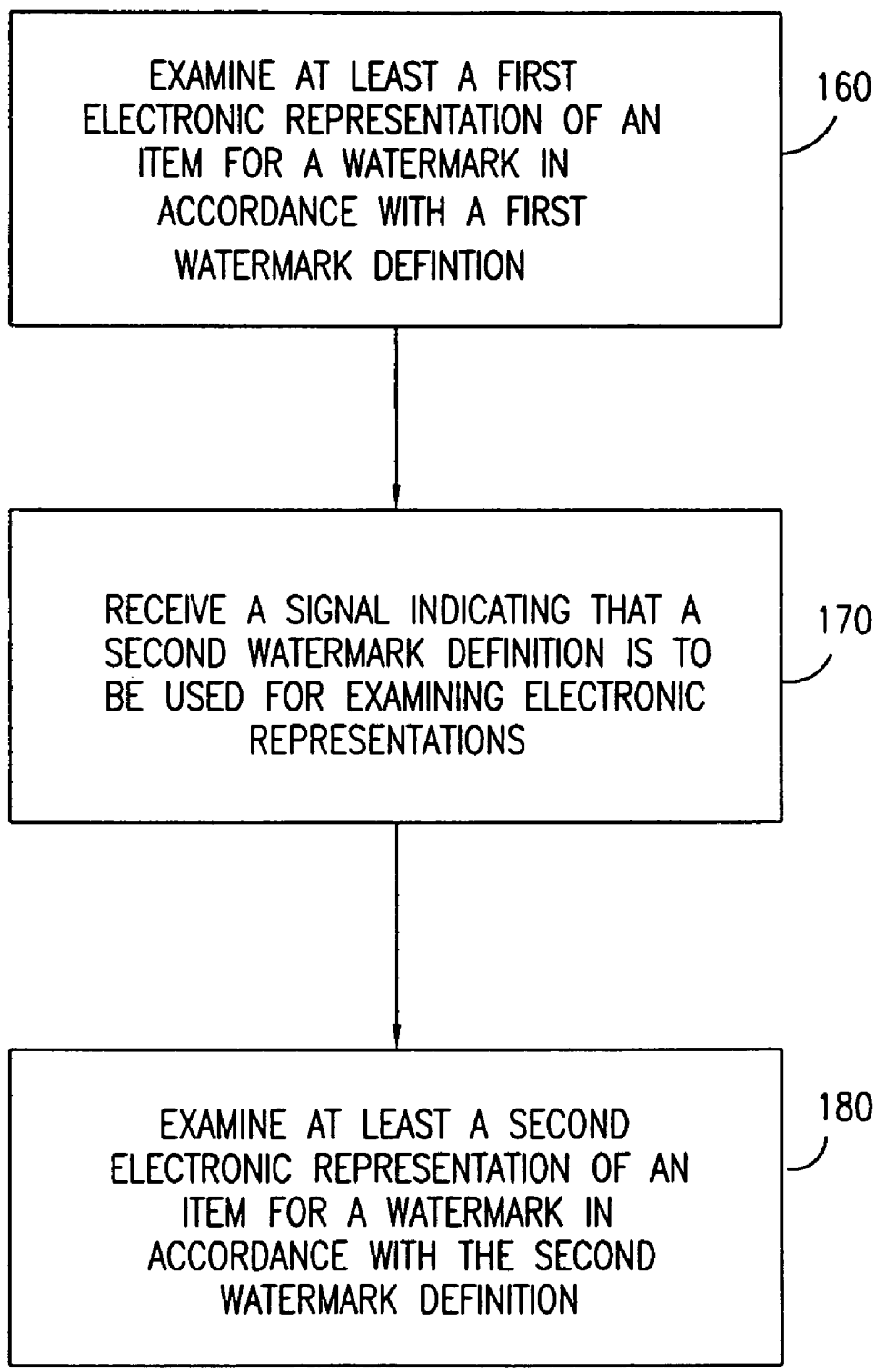

WATERMARK SYSTEM

RELATED APPLICATION INFORMATION

The present application is a Continuation of application Ser. No. 11/053,407, filed Feb. 8, 2005, Now U.S. Pat. No. 7,200,751, which is a Continuation of application Ser. No. 09/544,704, filed Apr. 7, 2000 now U.S. Pat. No. 7,007,165.

FIELD OF THE INVENTION

The present invention relates to electronic watermarking in general, and in particular to watermarking of electronic items which is resistant to removal of the watermark from the items.

BACKGROUND OF THE INVENTION

Electronic watermarking is well known in the art. Generally, in electronic watermarking a watermark signal of some kind is added to an electronic representation of an item, such as a recording or a broadcast signal. The added watermark signal known in the art may provide an indication of origin intended to provide traceability of a copied representation; and/or may indicate specific rights of a holder of the electronic representation, such as a right to use or play but no right to copy, or right to copy at reduced quality. Generally, implementation of such specific rights is termed "controlling access", and the field of controlling access is also referred to as "conditional access"; these terms are used with the indicated meanings throughout the present specification and claims. Typically, in the case of specific rights associated with a watermark, conditional access is enforced by all legitimate devices which are operative to access, play back, or otherwise utilize the electronic representation.

Added watermark signals may be added to a certain place in an electronic representation or may be "spread out" so that the watermark signal is found in many parts of the electronic representation. Added watermark signals may be easily perceived by one who plays back the representation, or may not be discernible upon normal playing of the representation.

The art of adding a signal, including a watermark signal, to a medium in order to embed information which is not easily discernible upon normal examination or playback is generally termed "steganography".

U.S. Pat. No. 5,606,609 to Houser et al describes an electronic document verification system and method in which a security object is embedded in an electronic document such as, for example, with an object linking and embedding (OLE) capability. Typically, the security object includes security information and an identifier for invoking the processing of the security information.

U.S. Pat. No. 5,607,188 to Bahns et al describes a technique of marking an optical disc for customized identification, in which a watermark is applied to a master disc, preferably by modifying the periodic diffraction grating effect created by encoded data in the disc.

U.S. Pat. No. 5,636,292 to Rhoads describes steganography methods employing embedded calibration data on a carrier to be identified, the methods being intended to provide robustness despite degradation of the carrier and permeation of an imbedded signal throughout the carrier.

U.S. Pat. No. 5,659,726 to Sandford, II et al describes a method of embedding auxiliary information into a set of host data, in which pixels in the host data which are nearly identical and which have values differing by less than an intrinsic noise value are manipulated and replaced with auxiliary data.

U.S. Pat. No. 5,664,018 to Leighton describes a watermarking process in which each of a set of copies of a work has a slightly modified form of a baseline watermark placed within a critical region of the data, the slight variations not being perceptually visible and not interfering with the work.

U.S. Pat. No. 5,687,236 to Moskowitz et al describes a steganographic method and device for encoding and decoding information into a stream of digitized samples, in which the information is contained in the samples, not prepended or appended to the sample stream. The method of Moskowitz et al is used to establish ownership of copyrighted digital multimedia content and to provide a disincentive to piracy.

Published PCT application WO 96/41468 describes a method and apparatus for copyright protection of various recording media using a combination of a video finger print signal and an authenticating signature. The authenticating signature is designed in such a way that it will not be transferred to illicit copies made on CD receivers. When a copy of a protected CD is played the absence of the authenticating signature causes the player to prohibit the disk from playing normally.

Published PCT application WO 97/13248 describes an electronic watermarking scheme which operates at a high level in the hierarchy of the (MPEG) source signal, thus attempting to ensure that the watermark is easily detectable but difficult to erase.

Published PCT application WO 97/22206 describes a method for marking a video and/or audio signal to identify, for example, that the signal is authentic and is not to be copied.

Published PCT application WO 97/26732 describes a method for stega-protection of computer code, encoding the code into a data resource with a digital watermark, the digital watermark containing licensing information interwoven with essential code resources.

Published PCT application WO 97/26733 describes a method for an encrypted digital watermark in which pseudo-random keys for encoding and decoding digital watermarks are generated and applied with human assistance.

Published PCT application WO 97/34391 describes a watermarking process intended to be resistant to collusion attacks.

Published PCT application WO 98/02864 describes optimization methods for insertion, protection and detection of digital watermarks based on individual characteristics of a given digital stream.

Published PCT application WO 98/03014 describes a method for detecting a watermark embedded in an information signal by correlating the information on signal with a plurality of watermarks.

European Patent Application 0 651 554 A1 describes a method and apparatus for addition and removal of digital watermarks in a hierarchical image storage and retrieval system, a digital watermark being added in a selected image resolution component and the means to remove it in an additional image component.

Israel Patent Application 120174, assigned to the same assignee as the present application, describes a digital protection system in which encryption control messages (ECMs) in a first format are replaced with ECMs in a second format. Corresponding applications, all assigned to the same assignee as the present application, include: U.S. patent application Ser. No. 09/014,791; published UK Patent Application 9725557.4, and published EPO Patent Application 98300596.8.

The disclosures of all references mentioned above and throughout the present specification are hereby incorporated herein by reference.

SUMMARY OF THE INVENTION

The present invention seeks to provide improved apparatus and methods for watermarking and watermark examining and detection.

Various different methods of producing and managing watermarks are described in the prior art. Some prior art watermarking methods are intended to make illicit removal of watermarks difficult. However, it is known that there are many methods for illicit watermark removal, and it is widely believed that any watermark known in the prior art can be removed if sufficient resources are devoted to removal of the watermark. The prior art does not provide a solution for providing continued protection after a watermark is successfully and illicitly removed.

In a first embodiment of the present invention, an electronic representation is provided with more than one watermark. Preferably each of the more than one watermarks is associated with a watermark definition, which may define a location of the watermark in the electronic representation, a method by which the watermark may be found, or any other appropriate parameter defining the watermark in a way sufficient to allow the watermark to be found.

A watermark examiner, operative to examine electronic representations for a watermark, preferably examines electronic representations in accordance with a first watermark definition; preferably but not necessarily, in order to avoid illicit tampering, the watermark examiner does not include any information, such as a second watermark definition, defining other watermarks beyond a first watermark. At some point, typically when it becomes known that knowledge as to how to remove the first watermark has become widespread, a signal is sent to the watermark examiner, the signal including a second watermark definition or information sufficient to derive a second watermark definition. From that point on, the watermark examiner preferably examines in accordance with the second watermark definition and not the first watermark definition.

In another preferred embodiment of the present invention, the watermark examiner, in response to a received signal as described above, may be operative to alter an electronic representation, typically an electronic representation comprising the first watermark, to comprise the second watermark.

There is thus provided in accordance with a preferred embodiment of the present invention a method for examining an electronic representation of an item for a watermark, the method including examining at least a first electronic representation of an item for a watermark in accordance with a first watermark definition, receiving a signal indicating that a second watermark definition is to be used for examining electronic representations, and examining at least a second electronic representation of an item for a watermark in accordance with the second watermark definition.

Further in accordance with a preferred embodiment of the present invention the method also includes controlling access to at least the second electronic representation based, at least in part, on a result of the examining at least a second electronic representation step.

Still further in accordance with a preferred embodiment of the present invention the first electronic representation and the second electronic representation are identical.

Additionally in accordance with a preferred embodiment of the present invention the signal includes a representation of the second watermark definition.

Moreover in accordance with a preferred embodiment of the present invention the method also includes retrieving the second watermark definition from a storage device in response to the received signal.

Further in accordance with a preferred embodiment of the present invention the method also includes computing the second watermark definition in response to the received signal.

Still further in accordance with a preferred embodiment of the present invention the first watermark definition and the second watermark definition each includes an indication of a location, within each electronic representation to be examined, at which a watermark, if present, is to be found.

Additionally in accordance with a preferred embodiment of the present invention the first watermark definition and the second watermark definition each includes an indication of a watermarking method according to which each electronic representation to be examined is to be examined for a watermark.

Moreover in accordance with a preferred embodiment of the present invention the signal includes authentication information for establishing that the signal originates from an authentic source, and the receiving step also includes verifying the authentication information to determine whether the authentication information is correct and rejecting the received signal if the authentication information is determined to be incorrect, thereby causing the first watermark definition to continue to be used for examining if the authentication information is incorrect.

There is also provided in accordance with another preferred embodiment of the present invention a watermark examiner for examining an electronic representation of an item for a watermark, the apparatus including a watermark definition store operative to store a watermark definition, watermark examination apparatus operatively associated with the watermark definition store and operative to examine an electronic representation of an item for a watermark in accordance with the watermark definition stored in the watermark definition store, and a watermark definition signal receiver operative to receive a signal indicating that a view watermark definition is to be used for examining electronic representations and to store the new watermark definition in the watermark definition store.

Further in accordance with a preferred embodiment of the present invention the watermark definition includes an indication of a location, within each electronic representation to be examined, at which a watermark, if present, is to be found.

Still further in accordance with a preferred embodiment of the present invention the watermark definition includes an indication of a watermarking method according to which each electronic representation to be examined is to be examined for a watermark.

Additionally in accordance with a preferred embodiment of the present invention the signal includes a representation of the second watermark definition.

Moreover in accordance with a preferred embodiment of the present invention the watermark examiner also includes a watermark storage memory for storing at least one watermark definition, and the watermark definition signal receiver is operative to retrieve the new watermark definition from the watermark storage memory in response to the received signal.

Further in accordance with a preferred embodiment of the present invention the watermark definition signal receiver is also operative to compute the second watermark definition in response to the received signal.

Still further in accordance with a preferred embodiment of the present invention the signal includes authentication information for establishing that the signal originates from an authentic source, and the watermark definition signal receiver also includes signal verification apparatus operative to verify the authentication information to determine whether the authentication information is correct and to reject the received signal if the authentication information is determined to be incorrect, thereby causing the first watermark definition to continue to be used for examining if the authentication information is incorrect.

There is also provided in accordance with another preferred embodiment of the present invention a method for altering an electronic representation of an item having a watermark, the method including providing a first electronic representation of an item, the first electronic representation including a first watermark, the first watermark corresponding to a first watermark definition, receiving a signal indicating that a second watermark definition is to be used, and altering the first electronic representation to include a second watermark corresponding to the second watermark definition.

Further in accordance with a preferred embodiment of the present invention the altering step includes altering the first electronic representation to no longer include the first watermark.

Still further in accordance with a preferred embodiment of the present invention the method also includes examining at least a second electronic representation for the second watermark.

Additionally in accordance with a preferred embodiment of the present invention the first electronic representation and the second electronic representation are identical.

Moreover in accordance with a preferred embodiment of the present invention the method also includes controlling access to at least the second electronic representation based, at least in part, on a result of the examining at least a second electronic representation step.

There is also provided in accordance with another preferred embodiment of the present invention a watermark alteration system for altering an electronic representation of an item having a watermark, the system including a watermark definition signal receiver for receiving a signal indicating that a second watermark definition is to be used, and watermark alteration apparatus for altering a first electronic representation, the first electronic representation including a first watermark corresponding to a first watermark definition, to include a second watermark corresponding to the second watermark definition.

Further in accordance with a preferred embodiment of the present invention the altering includes altering the first electronic representation to no longer include the first watermark.

Still further in accordance with a preferred embodiment of the present invention the system also includes watermark examining apparatus for examining at least a second electronic representation for the second watermark.

Additionally in accordance with a preferred embodiment of the present invention the first electronic representation and the second electronic representation are identical.

Moreover in accordance with a preferred embodiment of the present invention the watermark examining apparatus is also operative to control access to at least the second electronic representation based, at least in part, on a result of the examining of the at least a second electronic representation.

There is also provided in accordance with another preferred embodiment of the present invention a signal for indicating to a watermark examiner that a second watermark definition is to be used in place of a first watermark definition for examining electronic representations, the signal including a representation of a second watermark definition.

Further in accordance with a preferred embodiment of the present invention the signal also includes authentication information for establishing that the signal originates from an authentic source.

BRIEF DESCRIPTION OF THE DRAWINGS

The present invention will be understood and appreciated more fully from the following detailed description, taken in conjunction with the drawings in which:

FIG. 2 is a simplified flowchart illustration of a preferred method of operation of the watermark examiner of FIG. 1;

DETAILED DESCRIPTION OF A PREFERRED EMBODIMENT

Figure 1:
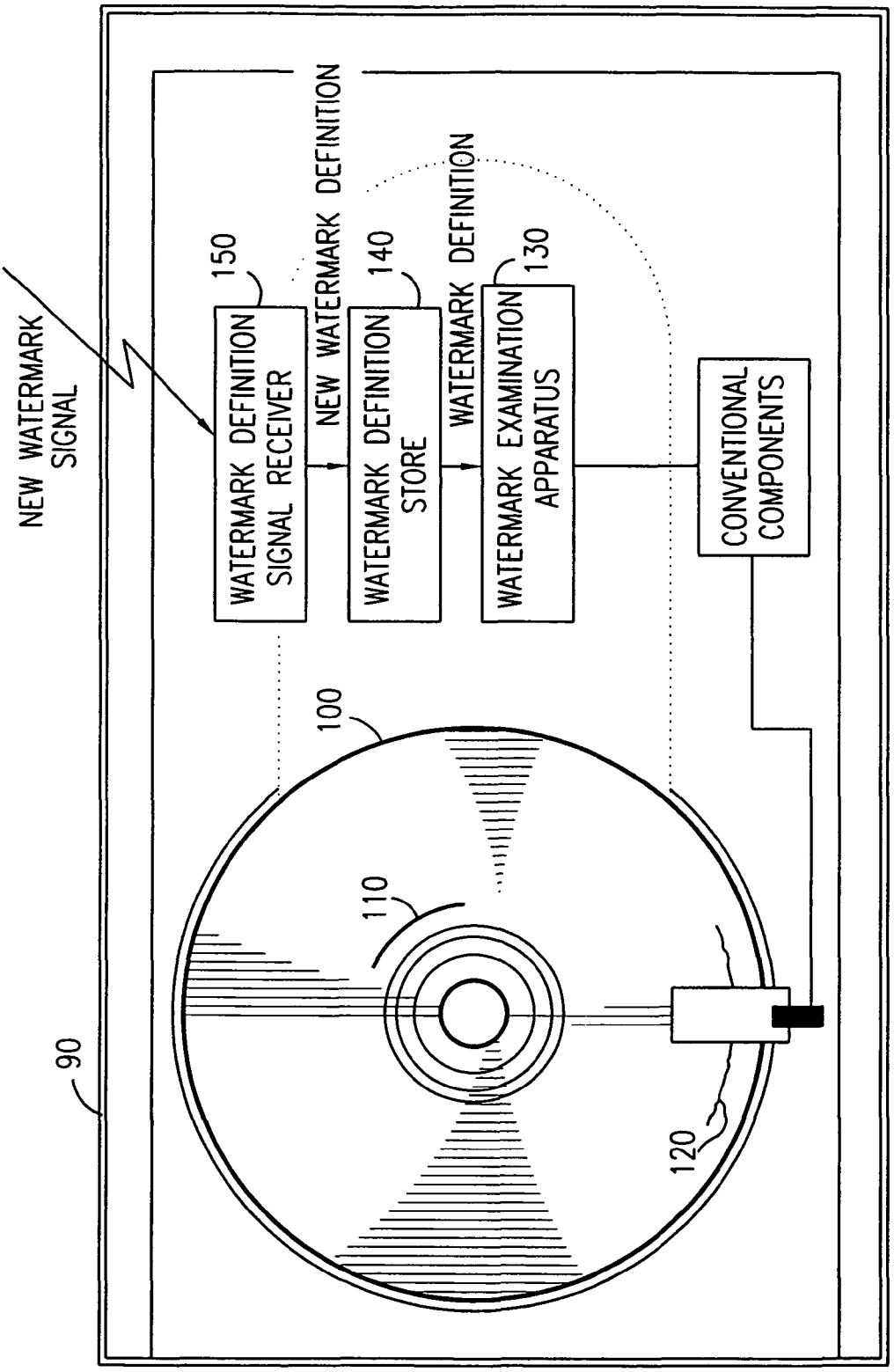
FIG. 1 is a simplified partly pictorial, partly block diagram illustration of a watermark examiner constructed and operative in accordance with a preferred embodiment of the present invention.

Reference is now made to FIG. 1 which is a simplified partly pictorial, partly block diagram illustration of a watermark examiner constructed and operative in accordance with a preferred embodiment of the present invention.

The present invention deals with watermarks in an electronic representation of an item. The terms "electronic representation of an item" and "electronic representation" are used interchangeably herein to denote any appropriate electronic representation capable of being watermarked with more than one watermark, examples of such electronic representations including without limitation: any appropriate electronic signal, including a signal internal to an electronic device, a signal sent or transmitted by an electronic device, and a broadcast signal; any appropriate electronic recording, such as a CD, a CD-ROM, a digital video disk (DVD), a digital tape recording, or any other electronic recording; an electronic representation inside a computer or stored on a computer readable medium; a digitization of a non-electronic representation of an item; and any other appropriate electronic representation.

The apparatus of FIG. 1 preferably comprises a watermark examiner 90, with which an electronic representation comprising a disk 100 is operatively associated. In the embodiment of FIG. 1 the disk 100, typically comprising a prerecorded disk such as a CD or a DVD, is shown by way of example of an electronic representation only, it being appreciated that persons skilled in the art would be able to appropriately modify the apparatus of FIG. 1 to be operative with other types of electronic representation such as those described above. It is particularly appreciated that the present invention is not limited to a disk or to any similar medium, but is applicable generally to electronic representations as mentioned above. It is further appreciated that, in the case of a disk such as the disk 100, either a pre-recorded and non-alterable disk or an alterable and/or rewritable disk may be used.

The disk 100 preferably comprises at least two watermarks, shown in FIG. 1 as a first watermark 110 and a second watermark 120. It is appreciated, as is well known in the art of watermarking, that a watermark may be: local to a particular part of an electronic representation or spread over most or all of an electronic representation; visible or otherwise sensible to a person viewing the electronic representation or a playback of the electronic representation, or invisible and not otherwise sensible; and may, generally, have a wide variety of different attributes similar to those which are known in the prior art. The first watermark 110 and the second watermark 120 are shown as being visible and localized by way of example only and for simplicity of depiction and description, it being appreciated that used of non-local and/or invisible watermarks may be preferred.

The terms "view" and "playback", in their various grammatical forms, are used throughout the present specification and claims to denote viewing, hearing, or otherwise experiencing with the senses a playback or other installation in palpable form of an electronic representation. Without limiting the generality of the foregoing and by way of example only, "view" may describe watching a television screen, listening to music, or reading a printed document, while "playback" may refer to audio playback, visual playback and/or printing of an electronic representation.

In addition to conventional components generally found in prior art playback device and which may be comprised in or operatively associated with the watermark examiner 90 and operative to provide disk playback functionality, as is well known in the art, the watermark examiner 90 preferably comprises watermark examination apparatus 130. The watermark examination apparatus 130 is preferably operative to examine the disk 100 for a watermark in accordance with a watermark definition. The watermark examination apparatus 130 may be operative, based on a watermark which is or is not found, to instruct other components of the watermark examiner 90, such as conventional components or other components (not shown) of the watermark examiner 90, to limit or otherwise modify playback of the disk 100, or to provide conditional access thereto, as is well known in the art.

The watermark examiner 90 also preferably comprises a watermark definition store 140, which may comprise any appropriate storage and retrieval apparatus, such as a memory, preferably comprising an appropriate non-volatile memory such as an NVRAM or an EEPROM. The watermark definition store 140 is preferably operative to store a watermark definition. The watermark definition store 140 is preferably operatively associated with the watermark examination apparatus 130 and operative to transmit a stored watermark definition stored in the watermark definition store 140 to the watermark examination apparatus 130. It is appreciated that, in an alternative embodiment of the present invention, the watermark definition store 140 may be comprised in the watermark examination apparatus 130.

The watermark examiner 90 also preferably comprises a watermark definition signal receiver 150, operatively associated with the watermark definition store 140. The watermark definition signal receiver 150 may comprise any appropriate receiver circuitry, as is well known in the art, operative to receive a signal comprising a new watermark definition, extract therefrom the new watermark definition, and transmit the new watermark definition to the watermark definition store 140. The signal received by the watermark definition signal receiver 150 is generally sent by a watermark definition center (not shown), which may be local to the watermark examiner 90 or remote therefrom. The signal may be sent to the watermark definition signal receiver 150 using any appropriate signal transmission means such as, for example: by wired transmission; by wireless transmission; by transmission via a network, such as the Internet or any other appropriate network; multiplexed together with other transmissions, including, in an alternative embodiment of the present invention, a transmission of the electronic representation of an item; as a non-multiplexed transmission; or otherwise, as is well known in the art of data transmission.

The operation of the system of FIG. 1 is now briefly described. When the disk 100 is played back the watermark examination apparatus 130 preferably examines the stream of played back electronic information thereby produced, either continuously or at defined intervals or at defined locations in the stream of played back electronic information as is well known in the art, to determine whether a watermark is present and, preferably, to determine the contents of the watermark. The watermark examination apparatus 130 preferably takes action based on the watermark, as is well known in the art and as is described above.

Alternatively, the watermark examination apparatus may play back a specific portion of the disk 100 in order to determine whether a watermark is present.

The watermark examination apparatus 130 preferably examines the played back electronic information, as described above, in accordance with a first watermark definition stored in and supplied by the watermark definition store 140. By way of example, the first watermark definition supplied by the watermark definition store 140 may cause the watermark examination apparatus 130 to examine the disk 100 or the played back electronic information as described above for the first watermark 110. The watermark definition store: may have been previously supplied with the first watermark definition substantially as described below with respect to a second watermark definition; may have been preloaded with the first watermark definition such as, for example, by preloading during manufacture of the watermark examiner 90; or may have been supplied with the first watermark definition in any other appropriate manner.

Generally, a new watermark signal will be sent to the watermark definition signal receiver 150 from a watermark definition center (not shown) upon a determination that it is appropriate to use a new watermark definition; for example, and without limiting the generality of the foregoing, it may be deemed appropriate to use a new watermark definition when it becomes known that knowledge as to how to remove the first watermark has become widespread.

A new watermark signal may comprise a new watermark definition, suitable for use directly by components such as the watermark definition store 140 and the watermark examination apparatus 130 of the watermark examiner 90. Alternatively, a new watermark signal may comprise instructions sufficient to allow an appropriate component of the watermark examiner 90, such as, for example, the watermark definition signal receiver 150, to derive a new watermark definition from the instructions comprised in the new watermark signal. By way of example only and without limiting the generality of the foregoing, the instructions might comprise n binary decisions which, when combined, may be used to derive a new watermark definition based on pre-knowledge of the n binary questions to which the decisions refer. Alternatively and by way of further example only, the instructions might comprise a key for decrypting a new watermark definition already stored in encrypted form in the watermark examiner 90, such as in the watermark definition signal receiver 150.

When the watermark definition signal receiver 150 receives a new watermark signal, the watermark definition signal receiver 150 preferably determines the correctness of the received signal using any appropriate method or methods well known in the art. Without limiting the generality of the foregoing, a new watermark signal may be digitally signed, as is well known in the art, and only a properly signed watermark signal may be accepted by the watermark definition signal receiver 150. A digital signing method, or alternatively any similar appropriate method, is believed to be preferred in order to prevent sending of a fraudulent new watermark signal, which could possibly cause the watermark examiner 90 to cease effective examination of the disk 100 for watermarks.

The new watermark definition signal comprises, as described above, a new watermark definition or an effective substitute therefor in the form of appropriate instructions. The new watermark definition, also termed herein a second watermark definition, is preferably stored in the watermark definition store 140 by the watermark definition signal receiver 150. Thereafter, by normal operation of the watermark examination apparatus 130 as described above, the watermark examination apparatus 130 uses the second watermark definition to examine, for example, the second watermark 120.

Thus, upon receipt of a new watermark signal the watermark examiner 90 ceases to examine for the first watermark 110 and begins to examine for the second watermark 120. It will be appreciated that continued protection is provided by the embodiment of FIG. 1 even in a case where the first watermark 110 has been successfully and illicitly removed. In this way, a solution is provided to a significant drawback in the prior art, in that the prior art does not provide a solution for providing continued protection after a watermark is successfully and illicitly removed.

Reference is now made to FIG. 2, which is a simplified flowchart illustration of a preferred method of operation of the watermark examiner of FIG. 1. The method of FIG. 2 preferably comprises the following steps:

At least a first electronic representation of an item, typically but not necessarily comprising a plurality of electronic representations of one or more items, is examined for a watermark in accordance with a first watermark definition (step 160).

A signal is received, the signal indicating that a second watermark definition is to be used for examining electronic representations (step 170). It is appreciated that the signal of step 170 may be as described above with reference to FIG. 1 or, alternatively, may be any appropriate signal indicating that a second watermark definition is to be used. After receipt of the signal, at least a second electronic representation of an item, typically but not necessarily comprising a plurality of electronic representations of one or more items, is examined for a watermark in accordance with the second watermark definition (step 180).

It is appreciated that the second electronic representation and the first electronic representation may be identical.

Figure 3A:
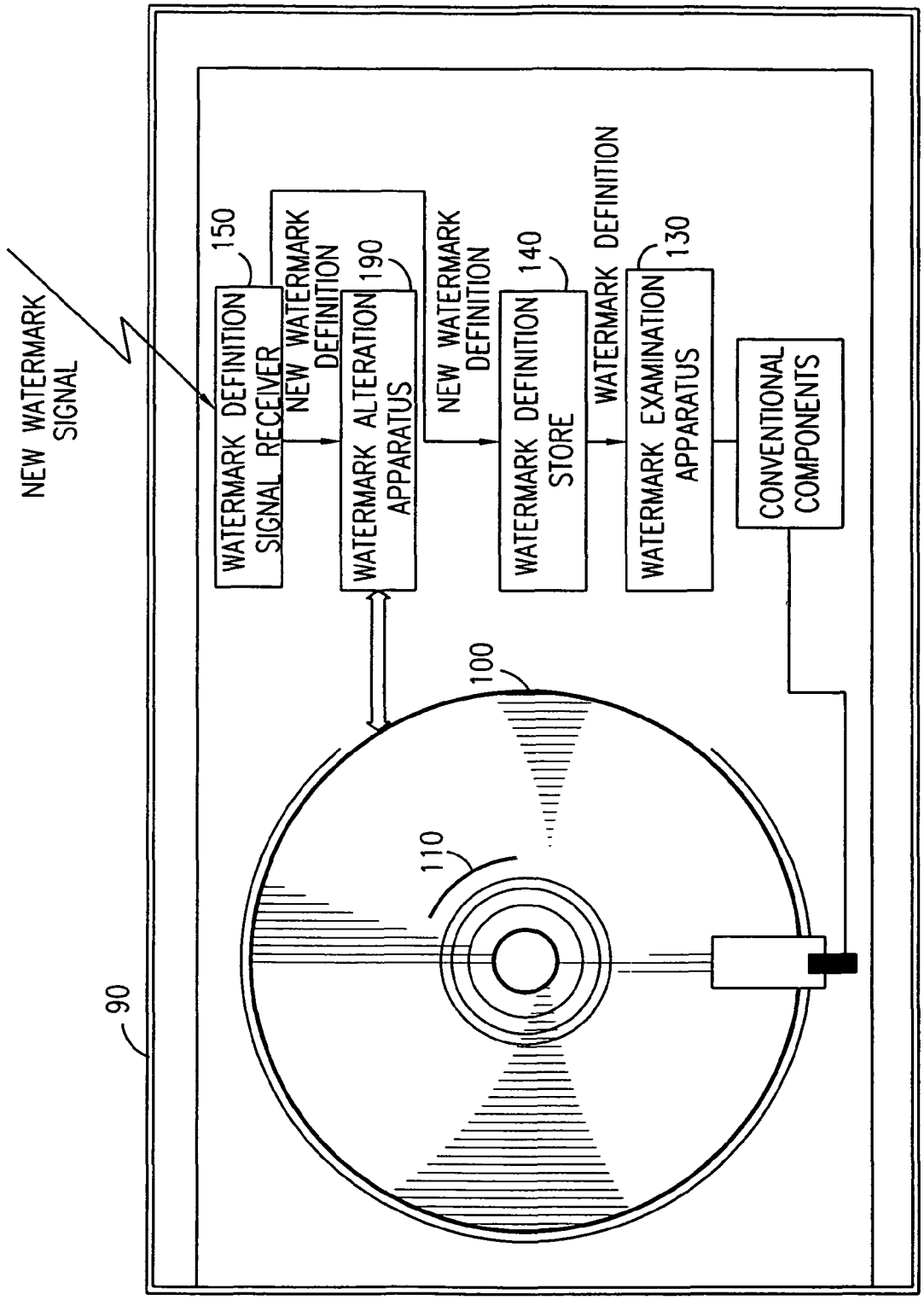
FIG. 3A is a simplified partly pictorial, partly block diagram illustration of a watermark alteration system constructed and operative in accordance with an alternative preferred embodiment of the present invention.

Reference is now made to FIG. 3A, which is a simplified partly pictorial, partly block diagram illustration of a watermark alteration system constructed and operative in accordance with an alternative preferred embodiment of the present invention. The apparatus of FIG. 3A is preferably similar to the apparatus of FIG. 1, except as described below. However, it is appreciated, as described more fully below, that certain depicted components of the apparatus of FIG. 3A which are common to the apparatus of FIG. 1 may be optional in the apparatus of FIG. 3A

The apparatus of FIG. 3A preferably also comprises watermark alteration apparatus 190, operatively associated with the watermark definition signal receiver 150 and typically operative to receive therefrom the new watermark definition. The watermark alteration apparatus 190 is also preferably in operative communication with the disk 100, either directly or through other components of the apparatus of FIG. 3A such as, for example, conventional components.

The watermark alteration apparatus 190 typically is implemented in special purpose hardware or in a combination of hardware and software. The watermark alteration apparatus 190 is operative, given a first watermark definition and a second watermark definition, as the new watermark definition is also termed herein, to add a second watermark (not shown in FIG. 3A) to the disk 100, the second watermark being in accordance with the second watermark definition. It is thus appreciated that, in the embodiment of FIG. 3A, the disk 100 preferably comprises an appropriate disk which is rewritable, erasable and writeable, or otherwise modifiable.

It is appreciated that, in another alternative embodiment of the present invention, the watermark definition store 140 and the watermark examination apparatus 130 of FIG. 3A are optional.

The operation of the apparatus of FIG. 3A is now briefly described. Except as described below, the operation of the apparatus of FIG. 3A may be similar to the operation of the apparatus of FIG. 1, described above.

Upon receipt of a new watermark signal by the watermark definition signal receiver 150, and upon receipt of the new watermark definition by the watermark alteration apparatus 190, the watermark alteration apparatus 190 is operative to add a new watermark, as described above, to the disk 100. Reference is now additionally made to FIG. 3B, which is a simplified partly pictorial, partly block diagram illustration of the system of FIG. 3A, useful in understanding the operation thereof.

Figure 3B:
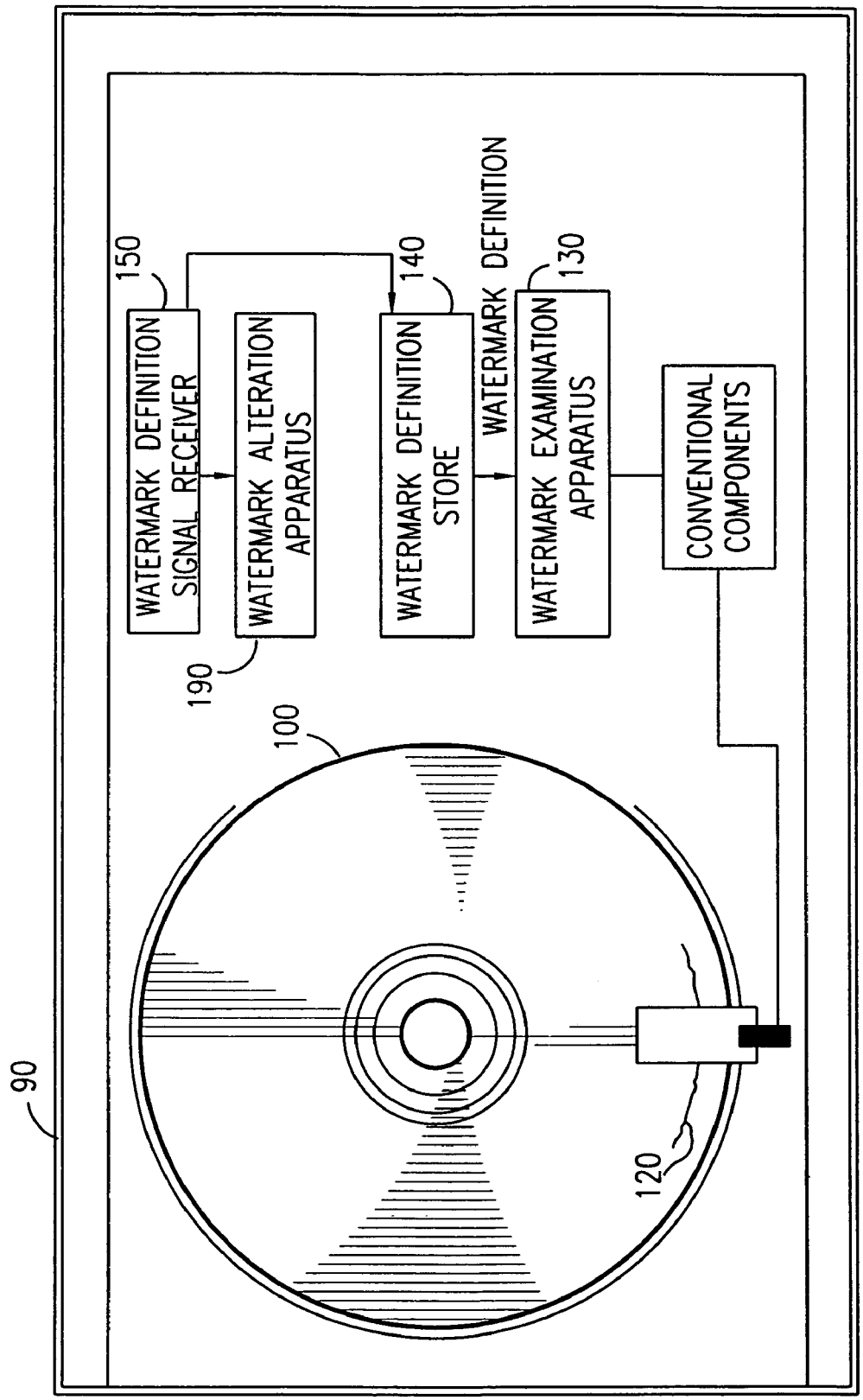
FIG. 3B is a simplified partly pictorial, partly block diagram illustration of the system of FIG. 3A, useful in understanding the operation thereof.

In FIG. 3B a second watermark 120 is shown, the first watermark 110 having been removed from the disk 100. Typically the first watermark 110 is removed by the watermark alteration apparatus 190 when the second watermark 120 is added, but alternatively the first watermark 110 need not be removed. Preferably, in a case where the first watermark 110 includes information such as conditional access information, similar information is included in the second watermark 120.

Preferably, in adding the second watermark 120 the watermark alteration apparatus 190 uses any suitable method, suitable to the type of disk 100 and the type of the second watermark 120 and possibly also of the first watermark 110. By way of example, and without limiting the generality of the foregoing, for a type of watermark which is spread out over all or most of the disk 100 the watermark alteration apparatus 190 may read, analyze, and rewrite all or most of the contents of the disk 100; for a localized type of watermark, the watermark alteration apparatus 190 may read, analyze, and rewrite only a portion of the contents of the disk 100. Persons skilled in the art will appreciate that an appropriate method of operation should be chosen accordingly, and that preferably the watermark alteration apparatus 190 is capable of implementing more than one such method of operation.

Figure 4:
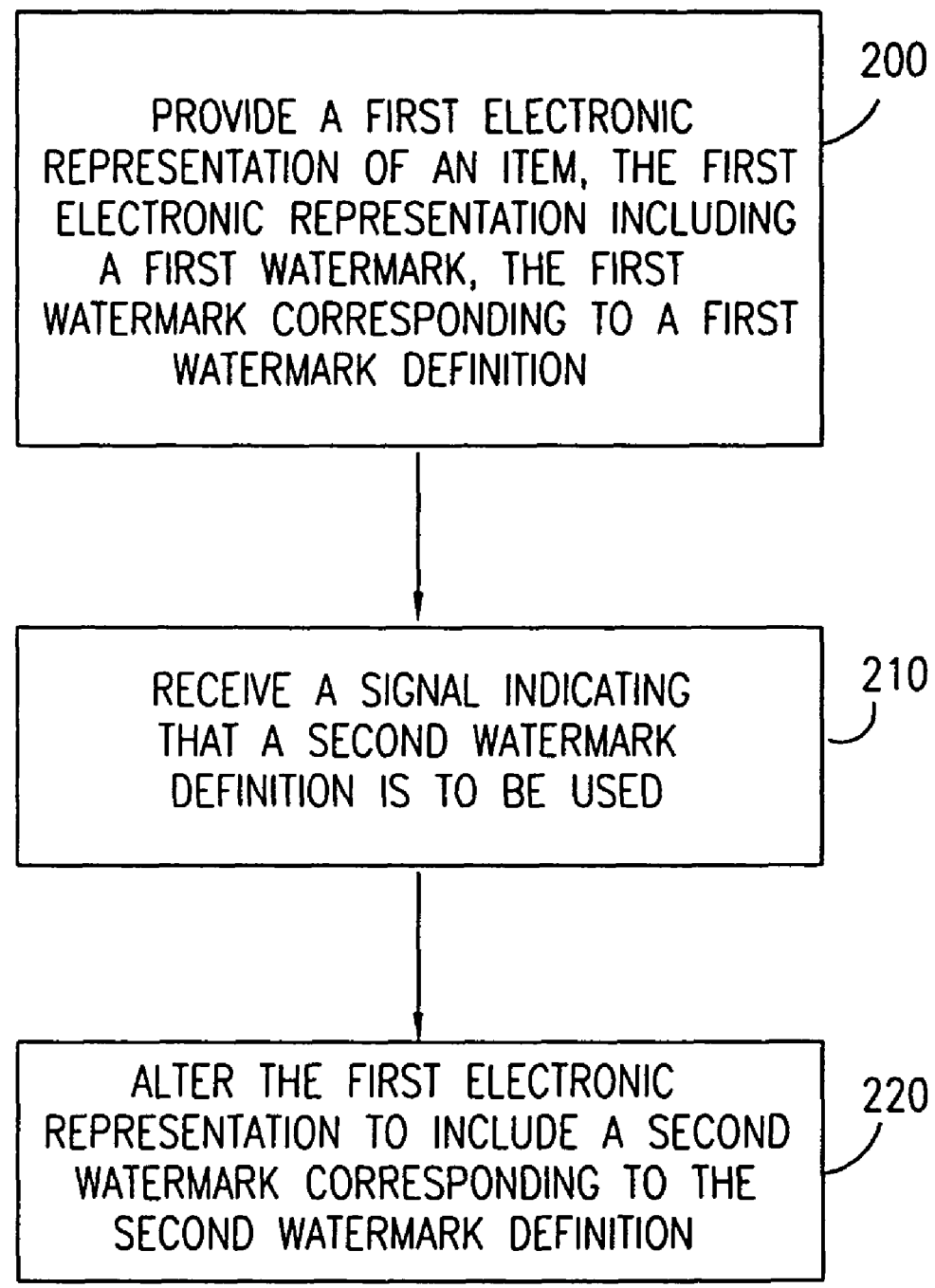
FIG. 4 is a simplified flowchart illustration of a preferred method of operation of the watermark alteration system of FIG. 3A.

Reference is now made to FIG. 4, which is a simplified flowchart illustration of a preferred method of operation of the watermark alteration system of FIG. 3A. The method of FIG. 4 preferably includes the following steps:

A first electronic representation of an item is provided; the first electronic representation includes a first watermark corresponding to a first watermark definition (step 200). When a signal is received indicating that a second watermark definition is to be used (step 210), the first electronic representation is altered to include a second watermark corresponding to the second watermark definition (step 220).

As described above with reference to FIG. 3A, the first watermark may optionally be removed as part of step 220. As also described above with reference to FIG. 3A, the method of FIG. 4 may be carried out in apparatus such as that described as another alternative embodiment of the present invention, in which elements 130 and 140 of FIG. 3A are typically not present.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for examining an electronic representation of an item for a watermark, the method comprising:
    examining at least a first electronic representation of an item for a watermark in accordance with a first watermark definition stored in a watermark definition store;
    receiving a signal indicating that a second watermark definition is to be used for examining electronic representations; and
    performing the following in response to receiving the signal:
    examining at least a second electronic representation of an item for a watermark in accordance with the second watermark definition.

2. A method according to claim 1 and also comprising:
    controlling access to at least the second electronic representation based, at least in part, on a result of the examining at least a second electronic representation step.

3. A method according to claim 1 and wherein the first electronic representation and the second electronic representation are identical.

4. A method according to claim 1 and wherein the signal comprises a representation of the second watermark definition.

5. A method according to claim 1 and also comprising:
    retrieving the second watermark definition from a storage device in response to the received signal.

6. A method according to claim 1 and also comprising computing the second watermark definition in response to the received signal.

7. A method according to claim 1 and wherein the first watermark definition and the second watermark definition each comprises an indication of a location, within each electronic representation to be examined, at which a watermark, if present, is to be found.

8. A method according to claim 1 and wherein the first watermark definition and the second watermark definition each comprises an indication of a watermarking method according to which each electronic representation to be examined is to be examined for a watermark.

9. A method according to claim 1 and wherein the signal comprises authentication information for establishing that the signal originates from an authentic source, and
    the receiving step also includes:
    verifying the authentication information to determine whether the authentication information is correct and rejecting the received signal if the authentication information is determined to be incorrect, thereby causing the first watermark definition to continue to be used for examining if the authentication information is incorrect.

10. A watermark examiner for examining an electronic representation of an item for a watermark, the examiner comprising:
    a watermark definition store operative to store a watermark definition;
    watermark examination apparatus operatively associated with the watermark definition store and operative to examine an electronic representation of an item for a watermark in accordance with the watermark definition stored in the watermark definition store; and
    a watermark definition signal receiver operative to receive a signal indicating that a new watermark definition is to be used for examining electronic representations and to store the new watermark definition in the watermark definition store,
    wherein the watermark examination apparatus is operative to examine the electronic representation of an item for a watermark in accordance with the new watermark definition in response to receipt of the signal by the watermark definition signal receiver.

11. A watermark examiner according to claim 10 and wherein the watermark definition comprises an indication of a location, within each electronic representation to be examined, at which a watermark, if present, is to be found.

12. A watermark examiner according to claim 10 and wherein the watermark definition comprises an indication of a watermarking method according to which each electronic representation to be examined is to be examined for a watermark.

13. A watermark examiner according to claim 10 and wherein the signal comprises a representation of the second watermark definition.

14. A watermark examiner according to claim 10 and wherein the watermark examiner also comprises a watermark storage memory for storing at least one watermark definition, and
    the watermark definition signal receiver is operative to retrieve the new watermark definition from the watermark storage memory in response to the received signal.

15. A watermark examiner according to claim 10 and wherein the watermark definition signal receiver is also operative to compute the second watermark definition in response to the received signal.

16. A watermark examiner according to claim 10 and wherein the signal comprises authentication information for establishing that the signal originates from an authentic source, and
    the watermark definition signal receiver also includes:
    signal verification apparatus operative to verify the authentication information to determine whether the authentication information is correct and to reject the received signal if the authentication information is determined to be incorrect, thereby causing the first watermark definition to continue to be used for examining if the authentication information is incorrect.

* * * * *